US008890045B2

(12) United States Patent
Toh et al.

(10) Patent No.: US 8,890,045 B2
(45) Date of Patent: Nov. 18, 2014

(54) OPTICAL ENCODER WITH A CURRENT REGULATING CIRCUIT FOR A LIGHT EMITTER

(75) Inventors: Kheng Hin Toh, Penang (MY); Gim Eng Chew, Penang (MY)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 310 days.

(21) Appl. No.: 13/409,815

(22) Filed: Mar. 1, 2012

(65) Prior Publication Data

US 2013/0228676 A1    Sep. 5, 2013

(51) Int. Cl.
*G01J 1/32*     (2006.01)

(52) U.S. Cl.
USPC ..................................... 250/205; 250/231.13

(58) Field of Classification Search
USPC ........ 250/231.13, 231.16, 214 R, 205; 341/9, 341/11, 13; 327/514
See application file for complete search history.

(56) References Cited

U.S. PATENT DOCUMENTS

| 4,359,688 | A  | * | 11/1982 | Haville | 327/120 |
| 4,649,267 | A  | * | 3/1987  | Ray     | 250/205 |
| 7,948,455 | B2 |   | 5/2011  | Han et al. | |
| 2011/0062887 | A1 | | 3/2011 | Hsu | |

FOREIGN PATENT DOCUMENTS

| CN | 1779750 | 5/2006 |
| CN | 101846581 | 9/2010 |
| WO | WO-2008099979 | 8/2008 |

* cited by examiner

*Primary Examiner* — Que T Le

(57) ABSTRACT

An LED current regulator can regulate an LED current of an encoder system. The LED current regulator may comprise a first analog multiplier and a second analog multiplier. Each of the first and second analog multipliers may be configured to receive respective photodetector output signals, characterized by a peak-to-peak voltage, Vpp, and may be configured to generate respective first and second multiplier output signals. The first and second multiplier output signals may be combined to produce a first DC level, which may be representative of the peak-to-peak voltage, Vpp, of the photodetector output signals.

20 Claims, 6 Drawing Sheets

OPTICAL ENCODER WITH A CURRENT REGULATING CIRCUIT FOR A LIGHT EMITTER

BACKGROUND

A typical motion detection optical encoder has a light emitter, an encoder disk with a plurality of apertures and a light detector with photodetectors. In general, an optical encoder works by emitting a collimated light beam towards the encoder disk. The light beam is interrupted by the encoder disk as the encoder disk moves. Portions of the collimated light beam project through the apertures, onto the light detector. As the encoder disk moves, the light pattern falling on the photodiodes changes; hence corresponding output signals generated by the photodetectors also change accordingly. The photodetectors detect these light patterns to generate corresponding output signals, which can be processed to produce digital waveforms. Such digital waveforms of the output signals can be subsequently translated to motion information, for example, a position or a velocity of a motor.

An encoder system may be susceptible to light degradation. Brightness of the light emitter in the encoder system may deteriorate through time. Additionally, unwanted dust particles or contaminants, which may accumulate on the light emitter or the lens, may affect the brightness of the light emitter. Such a light degradation may subsequently cause current generated by the photodetector to become lower, hence lowering the performance of encoder electronics.

Therefore, what is needed is a simple and effective LED regulation system which may detect light degradation and also may regulate the LED current in the encoder system, which may substantially overcome such light degradation. What is also needed is a real time system and method for providing a real time LED current regulation to the encoder system.

BRIEF DESCRIPTION OF THE DRAWINGS

Different aspects of the various embodiments of the invention will become apparent from the following specification, drawings and claims in which:

DETAILED DESCRIPTION

The present disclosure provides an LED current regulation system for an optical encoder. Brightness of a light emitter or LED in the optical encoder may deteriorate over time. Further, contaminants may accumulate on the surface of the LED, affecting brightness. The LED current regulation system may substantially overcome light degradation in the LED of the optical encoder.

Figure 1:
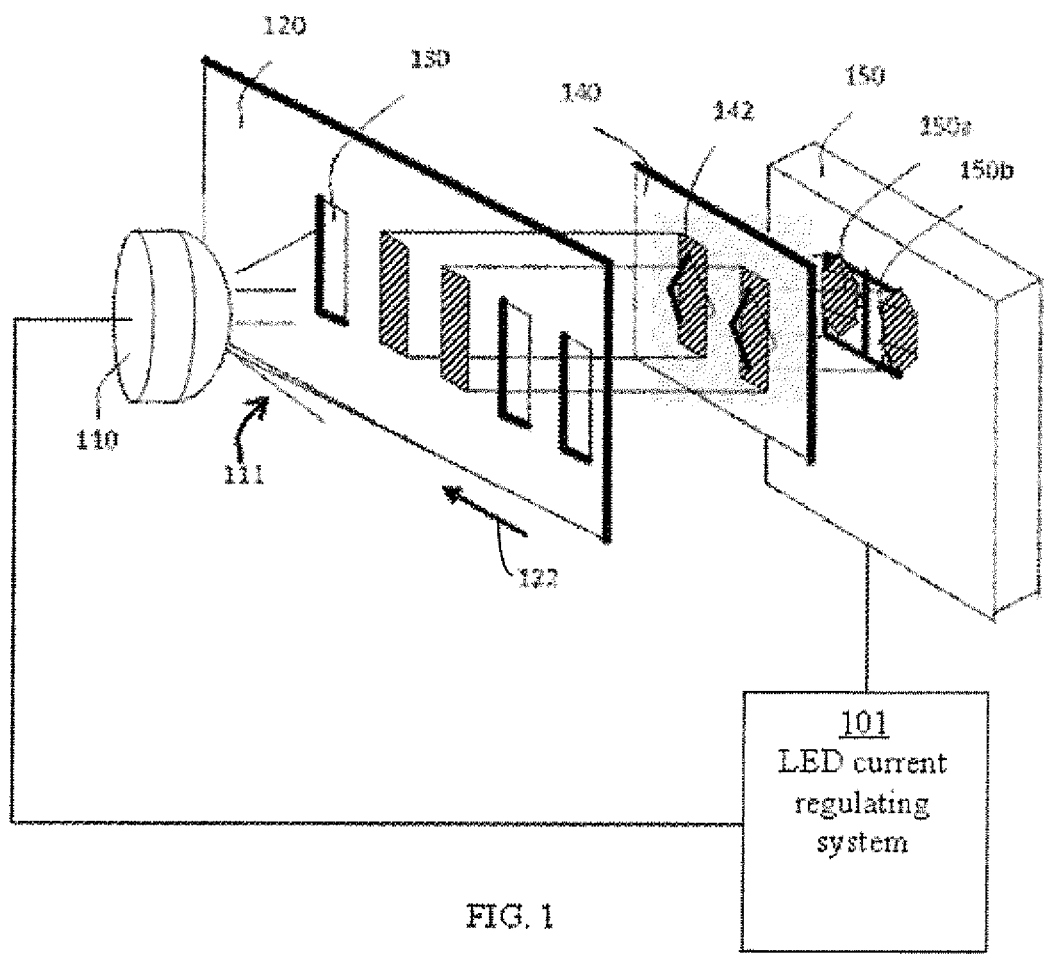
FIG. 1 shows an optical encoder with a reticle.

FIG. 1 shows an optical encoder 100. The optical encoder 100 may include an LED current regulating system 101. The optical encoder 100 may include a light emitter 110 configured to emit a collimated beam of light 111, an encoder disk 120 having a plurality of apertures 130, a reticle 140, a light detector 150 with photodetectors 150a and 150b. Light emitter 110, typically an LED (Light Emitting Diode), may project a collimated light beam 111 onto the encoder disk 120. As the encoder disk 120 may move in one direction, for example, in direction 122, the collimated light beam 111 may be interrupted by masked or optically non-transparent portions of the encoder disk 120.

As the encoder disk 120 moves, portions of the collimated light beam 111 may project through the apertures 130 onto the light detector 150 and may sweep across the photodetectors 150a and 150b. As the encoder disk 120 moves, the light pattern 142 projected onto the photodetectors 150a and 150b may change; thus corresponding output signals generated by the photodetectors 150a and 150b may also change accordingly. These output signals may subsequently be translated to motion information corresponding to an object position or a velocity.

As shown in FIG. 1, the optical encoder 100 may include reticle 140. The reticle 140 may be implemented to generate quasi-sinusoidal and quasi-cosinusoidal signals. Further, reticle 140 may be implemented to change or adjust the spatial resolution of the encoder 100.

Light degradation may affect performance of encoder electronics because a degraded LED may generate a lower light intensity, hence causing the photodetector of the encoder to generate reduced signal photocurrents. Accordingly, LED current regulating system 101 may be advantageously coupled to the LED for regulating the current of the LED. In turn, regulating the current of the LED may regulate (or more particularly may boost) LED brightness, which may substantially overcome such LED light degradation.

Figure 2:
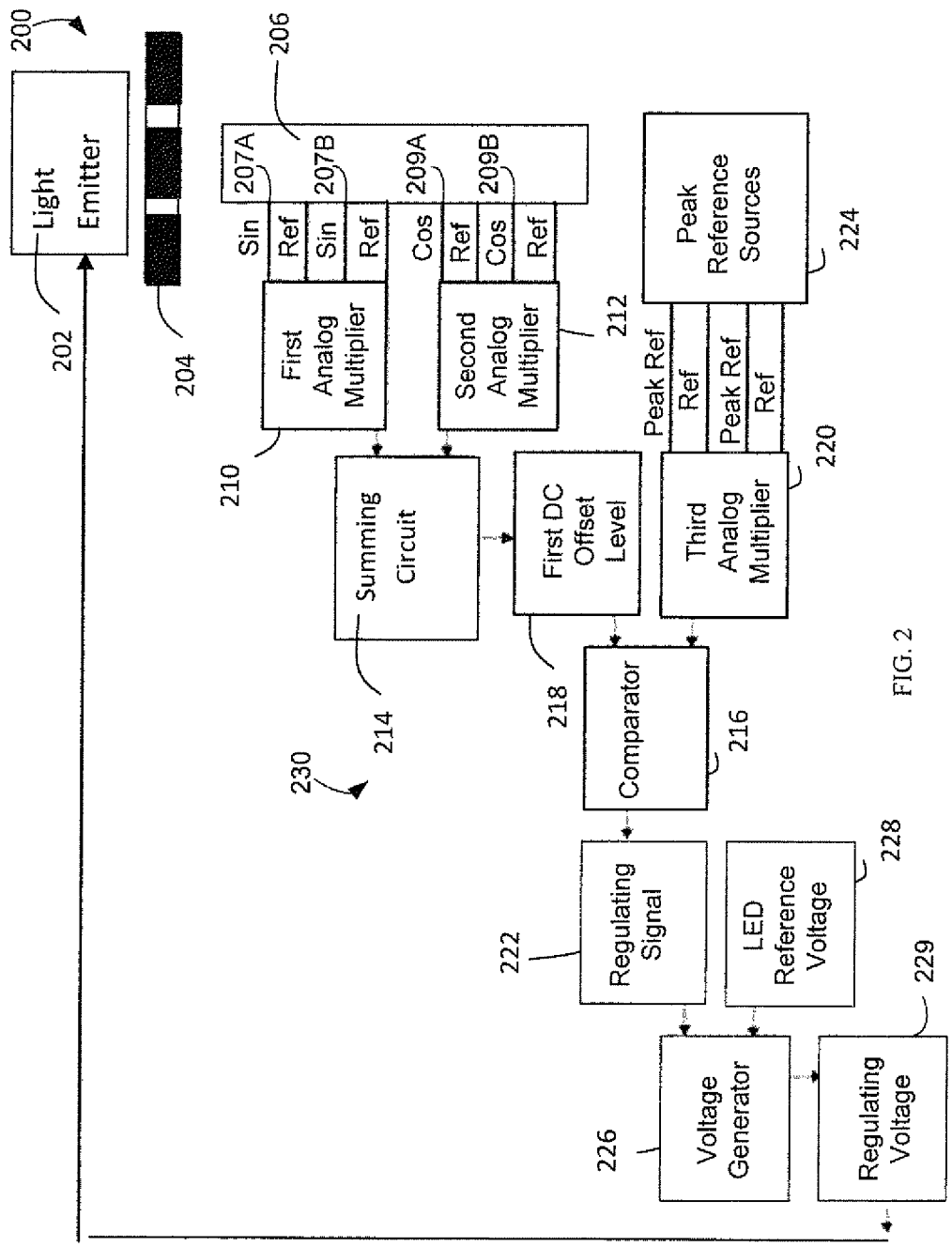
FIG. 2 shows a block diagram of an LED current regulating system for an optical encoder system.

FIG. 2 shows a block diagram of an LED current regulating system for an optical encoder 200. The optical encoder 200 may include a light emitter 202, an encoder disk 204, a light detector 206 and a light emitter regulating circuit 230. The light detector 206 may be optically coupled with the light emitter 202 through the encoder disk 204 for receiving light from the light emitter 202.

In one embodiment, the light emitter regulating circuit 230 may be coupled with the light detector 206 and the light emitter 202 for regulating the light emitter 202 in response to the light received by the light detector 206. The light emitter regulating circuit 230 may be configured to regulate the light emitter 202 of the optical encoder 200 in a substantially real time manner. The light emitter regulating circuit 230 may include a first analog multiplier 210; a second analog multiplier 212; a summing circuit 214 and a comparator 216 to generate a light emitter regulating signal.

In one embodiment, the light emitter regulating circuit 230 may comprise a first analog multiplier 210 having a first multiplier input coupled with the light detector 206 for receiving a sinusoidal detector signal from the light detector 206. The light emitter regulating circuit 230 may further comprise a second analog multiplier 212 having a second multiplier input coupled with the light detector 206 for receiving a cosinusoidal detector signal from the light detector 206.

In one embodiment, the first analog multiplier 210 and the second analog multiplier 212 may be coupled with light detector 206. More particularly, the first and second analog multipliers (210, 212) of FIG. 2 may be coupled with photodetectors (for example, photodetectors 150a and 150b discussed previously herein with respect to FIG. 1). The first and second analog multipliers (210, 212) may be configured to receive output signals generated by the photodetectors in response to light emitted by the light emitter 202. Output signals that are generated by the photodetectors in response to light may be in the form of photocurrents.

In one embodiment, the first analog multiplier 210 may have a first multiplier input. This first multiplier input may be coupled with the light detector 206 for receiving a sinusoidal detector signal 207A from the light detector 206. Further, the first analog multiplier may be configured for generating a first multiplier output signal comprising a sine squared ("$\text{Sin}^2$") signal based at least in part on the sinusoidal detector signal 207A. The first analog multiplier 210 may be coupled with the light detector 206 for receiving first and second sinusoidal detector signals 207A, 207B for generating the first multiplier output signal comprising the sine squared ("$\text{Sin}^2$") signal.

In other words, the first analog multiplier 210 may be configured to receive the first multiplier input from the light detector 206 to generate the first multiplier output. For example, the first analog multiplier 210 may be configured to receive as input two sinusoidal signals 207A, 207B from the light detector 206, and both the sinusoidal signals 207A, 207B may be further multiplied to produce the output comprising the sine squared ("$\text{Sin}^2$") signal. This output may further comprise some DC offset. The DC offset may substantially correspond to an offset value of the input signals 207A, 207B, if compared with a corresponding reference signal.

Accordingly, the first analog multiplier 210 may be configured to receive two input signals, for example two sinusoidal detector signals 207A, 207B from the light detector 206. In response, the first analog multiplier may generate output the sine squared ("$\text{Sin}^2$") signal and may also generate some DC offset, if there is any. The DC offset of the first analog multiplier may be an offset value of the sinusoidal input signals 207A, 207B as compared with one or more input reference signals (REF's input to the first analog multiplier 210 as shown in FIG. 2). For example, the first analog multiplier 210 may be configured to receive as input two sinusoidal signals and one or more reference signals (REF's). Thus the first multiplier output signal generated by the first analog multiplier may comprise the sine squared ("$\text{Sin}^2$") signal and may further comprise some DC offset.

Similarly, the second analog multiplier 212 may have a second multiplier input. This second multiplier input may be coupled with the light detector 206 for receiving a cosinusoidal detector signal 209A from the light detector 206. Further, the second analog multiplier may be configured for generating a second multiplier output signal comprising a cosine squared ("$\text{Cos}^2$") signal based at least in part on the cosinusoidal detector signal 209A. The second analog multiplier 212 may be coupled with the light detector 206 for receiving first and second cosinusoidal detector signals 209A, 209B for generating the second multiplier output signal comprising the cosine squared ("$\text{Cos}^2$") signal.

In other words, the second analog multiplier 212 may be configured to receive the second multiplier input from the light detector 206 to generate the second multiplier output. For example, the second analog multiplier 212 may be configured to receive as input two cosinusoidal signals 209A, 209B from the light detector 206, and both the cosinusoidal signals 209A, 209B may be further multiplied to produce the output comprising the cosine squared ("$\text{Cos}^2$") signal. This output may further comprise some DC offset. The DC offset may substantially correspond to an offset value of the input signals 209A, 209B, in comparison to a corresponding reference signal.

Accordingly, the second analog multiplier 212 may be configured to receive two input signals, for example two cosinusoidal detector signals 209A, 209b from the light detector 206. In response, the second analog multiplier may generate output of the cosine squared ("$\text{Cos}^2$") signal and may also generate some DC offset, if there is any. The DC offset of the second analog multiplier may be an offset value of the cosinusoidal input signals 209A, 209B as compared with one or more input reference signals (REF's input to the second analog multiplier 212 as shown in FIG. 2). For example, the second analog multiplier 212 may be configured to receive as input two cosinusoidal signals and one or more reference signals (REF's). Thus the second multiplier output signal generated by the second analog multiplier may comprise the cosine squared ("$\text{Cos}^2$") signal and may further comprise some DC offset.

In one embodiment, the light emitter regulating circuit 230 may include a summing circuit 214 coupled with the first multiplier output and the second multiplier output. The summing circuit 214 may be configured to generate a first DC offset signal 218. More particularly, the summing circuit 214 may be coupled with the first analog multiplier 210 and the second analog multiplier 212, for summing the first multiplier output signal, comprising the sine squared ("$\text{Sin}^2$") signal, with the second multiplier output signal, comprising the cosine squared ("$\text{Cos}^2$") signal, so as to generate the first Direct Current (DC) offset signal 218.

In theory, combining the first and the second multiplier output signals may be substantially equivalent to the summation of sine squared ("$\text{Sin}^2$") with cosine squared ("$\text{Cos}^2$"), which may yield a result which may be substantially equal to one (ie. $\text{Sin}^2 + \text{Cos}^2 = 1$). By combining the output from the first analog multiplier 210 (ie. the sine squared ("$\text{Sin}^2$") signal with some DC offset) with the output from the second analog multiplier 212 (ie. the cosine squared ("$\text{Cos}^2$") signal with some DC offset), the summing circuit 214 may generate the first DC offset signal 218 (or voltage value). The first DC offset signal 218 may be substantially representative of a peak-to-peak voltage, Vpp of sinusoidal output signals and/or cosinusoidal output signals as generated by the light detector 206.

In one embodiment, the light emitter regulating circuit 230 may further comprise a third analog multiplier 220 to receive one or more peak reference input voltages from one or more peak reference sources 224. The third analog multiplier 220 may generate a peak reference output signal in response to the one or more peak reference input voltages from the one or more peak reference sources 224. The third analog multiplier 224 may be configured to provide a process offset and a thermal offset that are substantially similar (i.e. tracking) to those of the first analog multiplier 210 as well as the second analog multiplier 212.

The first, second and third analog multipliers 210, 212, 220 may be fabricated as a multiplier block, and may be fabricated together within the same integrated circuit. Just as the sinusoidal detector output signals and the cosinusoidal detector output signals may be subject to respective process offset and thermal offset of each of the first and second analog multipliers 210, 212, likewise the peak reference input voltages may be subject to substantially similar (i.e. tracking) processing and thermal offset of the third analog multiplier 220. The foregoing may advantageously take into consideration balancing the process, temperature and voltage effects for members of the light emitter regulating circuit 230. Further, the foregoing may ensure that if the analog multiplier block is susceptible to temperature, process and voltage variations, the peak reference output signal of the third analog multiplier 220 may also be subjected to the same (i.e tracking and/or balancing) variation. The peak reference output signal level may be set to correspond to any desired Vpp value of the sinusoidal detector output signals and the cosinusoidal detector output signals, for example, 1 Vpp, 1.5 Vpp or 2 Vpp.

The light emitter regulating circuit 230 may be configured to detect degradation of light emitter 202 by comparing the first Direct Current ("DC") offset signal 218 against the peak reference output signal, which may be output by the third analog multiplier 220. The light emitter regulating circuit 230 may comprise a comparator 216 configured to receive as a first comparator input, the first Direct Current offset signal 218 (ie. the output of the summing circuit 214). Comparator 216 may receive as a second comparator input, the peak reference output signal from the third analog multiplier 220. In response to comparing the inputs of the first DC offset signal 218 and the peak reference output signal, the comparator 216 may generate an output of a light emitter regulating signal 222.

In other words, the comparator 216 may be configured to receive the first comparator input coupled with the output of the summing circuit 214 for receiving the first Direct Current ("DC") offset signal 218, and configured to receive the second comparator input coupled with the output of the third analog multiplier 220 for receiving the peak reference output signal. The comparator 216 may compare the peak reference output signal to the first DC offset signal 218, and may substantially ascertain or substantially determine a voltage difference between the two. Such resulting voltage difference may be output by the comparator 216 as light emitter regulating signal 222, which may subsequently be used for regulating the light emitter 202.

Accordingly, the comparator 216 may be configured to determine, or substantially determine, the voltage difference between the first DC offset signal 218 and the peak reference output signal, wherein such voltage difference may be an indication of degradation level of the light emitter 202. The determined voltage difference (for example, a value in voltage) may be further converted to current, which may be subsequently used for regulating the light emitter 202 for substantially compensating the light degradation. In one example, the comparator 216 may be configured to detect the light emitter light deterioration by comparing the first Direct Current ("DC") offset signal 218 with the peak reference output signal. The first DC offset signal 218 generated by the summing circuit 214 may be compared with the peak reference output signal to produce a Vpp difference (or peak voltage difference) of the first DC offset signal 218 with respect to the peak reference output signal. In one embodiment, the comparator 216 may be an operational amplifier.

In one embodiment, the peak reference output signal may correspond to a substantially ideal Vpp value of the sinusoidal detector output signals and the cosinusoidal detector output signals, which may be generated by the light emitter of an encoder system under a perfect or substantially ideal condition. For example, under an ideal situation, a perfect encoder system having a good (or non-degraded) light emitter may generate a substantially sinusoid output signal having a substantially ideal Vpp value. The substantially ideal Vpp value as generated by such a perfect encoder system may be used as a reference voltage for gauging light deterioration of the light emitter of the encoder system. Thus, if the Vpp of the sinusoidal detector output signal generated by the encoder system has been found to vary from the substantially ideal Vpp value, this would indicate that the generated sinusoidal detector output may have a corresponding offset, and hence the light emitter of the encoder system may have deteriorated or degraded.

In one embodiment, the output of the comparator 216 may be coupled with the light emitter 202 for regulating the light emitter 202 in response to the light emitter regulating signal 222. The voltage difference between the DC offset signal 218 and the peak reference output signal, as generated by the comparator 216 may vary, and may provide a variation or adjustment signal difference from a bias voltage, which can be used externally to bias an external NPN transistor of the light emitter 202.

Further, the output of the comparator 216 may be processed or may be conditioned by an operational amplifier for biasing it to an intended voltage bias point. In one embodiment, the light emitter regulating circuit 230 may further comprise an LED voltage generator 226 configured to receive the light emitter regulating signal 222 generated by the comparator 216 as input. The LED voltage generator 226 may also be configured to receive an LED reference voltage 229 as another input for bias selection. In response to these inputs, the LED voltage generator 226 may generate an LED regulating voltage 229. The LED voltage generator 226 may be an operation amplifier, which may be configured to convert the light emitter regulating signal 222 to current, which in turn may eventually be used to regulate the light emitter 202 or LED for compensating LED light degradation.

Figure 3:
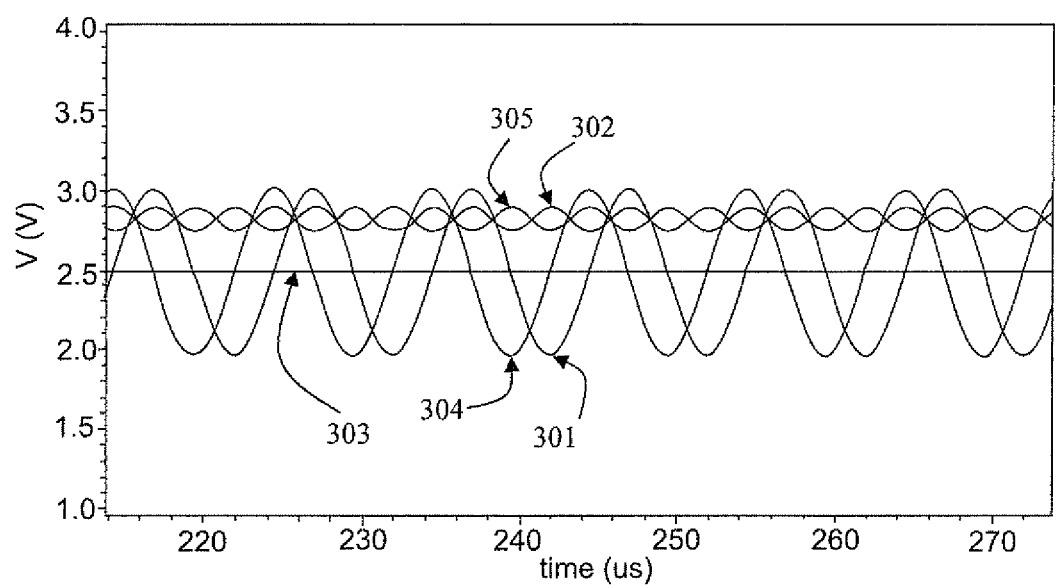
FIG. 3 illustrates examples of wave diagrams of a light emitting regulating system.

FIG. 3 illustrates examples of wave diagrams of a light emitter regulating system. As discussed previously with respect to FIG. 2, the first analog multiplier 210 may be coupled with the light detector 206 for receiving a sinusoidal detector signal 207 from the light detector 206. FIG. 3 illustrates sinusoidal detector signal 301 as a wave diagram. The first analog multiplier may be configured to receive sinusoidal detector signal 301 from the light detector to subsequently generate a sine squared ("Sin^2") signal 302 as output. In one embodiment, the first analog multiplier may be configured to receive two signals of the sinusoidal detector signal 301 from the light detector, to generate an output of the sine squared ("Sin^2") signal and some DC offset, if there is any. The DC offset may be the offset value of the sinusoidal detector signal 301, if compared with a reference signal 303. The reference signal 303 may be a reference voltage (Vref) or a targeted voltage of sinusoidal detector signal generated by the light detector under a perfect or substantially ideal condition.

Additionally, the second analog multiplier may also be configured to receive a cosinusoidal detector signal 304 from the light detector to subsequently generate a cosine squared ("Cos^2") signal 305 with some DC offset. In one embodiment, the second analog multiplier may be configured to receive two signals of the cosinusoidal detector signal 304 from the light detector, to generate an output of the cosine squared ("Cos^2") signal 305 and some DC offset, if there is any. The DC offset may be the offset value of the cosinusoidal detector signal 304 if compared with reference signal 303.

Figure 4:
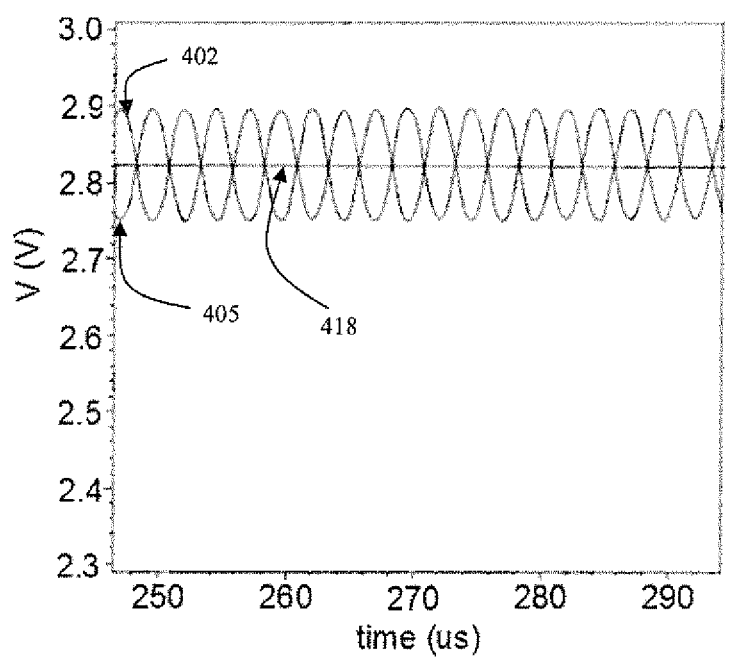
FIG. 4 illustrates another example of wave diagrams of a light emitting regulating system.

FIG. 4 illustrates another example of wave diagrams of a light emitter regulating system. In one embodiment, light emitter regulating circuit may comprise the summing circuit coupled with the first multiplier output and the second multiplier output. The summing circuit may be configured for summing the cosine squared ("Cos^2") signal 402 with the sine squared ("Sin^2") signal 405, so as to generate the first Direct Current (DC) offset signal 418. In theory, combining the first and the second multiplier output signals may be substantially equivalent to the summation of sine squared ("Sin^2") with cosine squred ("Cos^2"), which may yield a result which may be substantially equal to one (ie. Sin^2+Cos^2=1). By combining the output from the first analog multiplier (ie. the Sin^2 signal 405 with some DC offset) with the output from the second analog multiplier (ie. the Cos^2 signal 402 with some DC offset) the summing circuit may generate the first DC offset signal 418. The first DC offset signal 418 may be substantially representative of peak-to-peak voltage, Vpp of sinusoidal output signals and/or cosinusoidal output signals as generated by the light detector.

Figure 5:
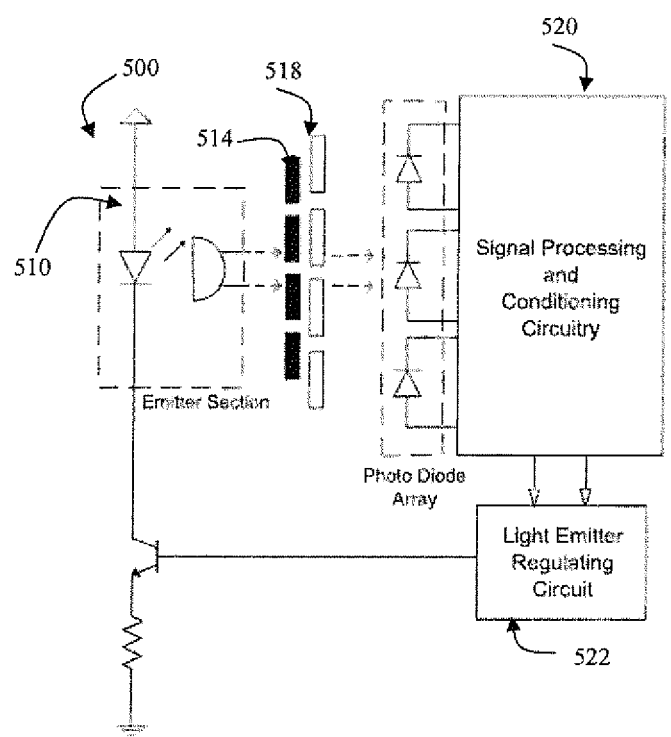
FIG. 5 is a diagram of an optical encoder with the light emitter regulating circuit.

FIG. 5 is a diagram of optical encoder 500 with the light emitter regulating circuit 522. The optical encoder system 500 may comprise light emitter 510, encoder disk 514 having a plurality of apertures, reticle 518, light detector 520 with Photo Diode Array (PDA), and a light emitter regulating circuit 522. In one embodiment, the reticle 518 may be configured to generate sinusoidal or quasi-sinusoidal signals as well as to change or adjust the spatial resolution of the encoder 500. Further, signal processing and conditioning circuitry may provide initial processing and/or conditioning of photocurrents generated by the Photo Diode Array of light detector 520.

In one embodiment, the light emitter regulating circuit 522 may be coupled with the light detector 520 and the light emitter 510 for regulating the light emitter 202 in response to the light received by the light detector 520. The light emitter regulating circuit 522 may be configured to receive as input the sinusoidal output signals generated by the light detector 520. For detecting degradation of the light emitter 510, the light emitter regulating circuit 522 may be configured to detect an offset signal.

The detected offset signal may be further compared against a certain voltage reference to produce a light emitter regulating signal which may eventually be used for regulating the light emitter. In one embodiment, the light emitter regulating circuit 522 may be configured to determine a voltage difference between the detected offset signal, which is caused by the degradation in the light emitter and a voltage reference. Such voltage difference may be an indication of degradation level of the light emitter 510. The determined voltage difference (value in voltage) may be further converted to current which may be subsequently used for regulating the light emitter 520 to compensate for light degradation. In addition, the voltage difference generated by the light emitter regulating circuit 522 may be further processed by an operational amplifier for converting the light emitter to current which may eventually be used to regulate the light emitter 520 or LED for compensating the LED light degradation.

Figure 6:
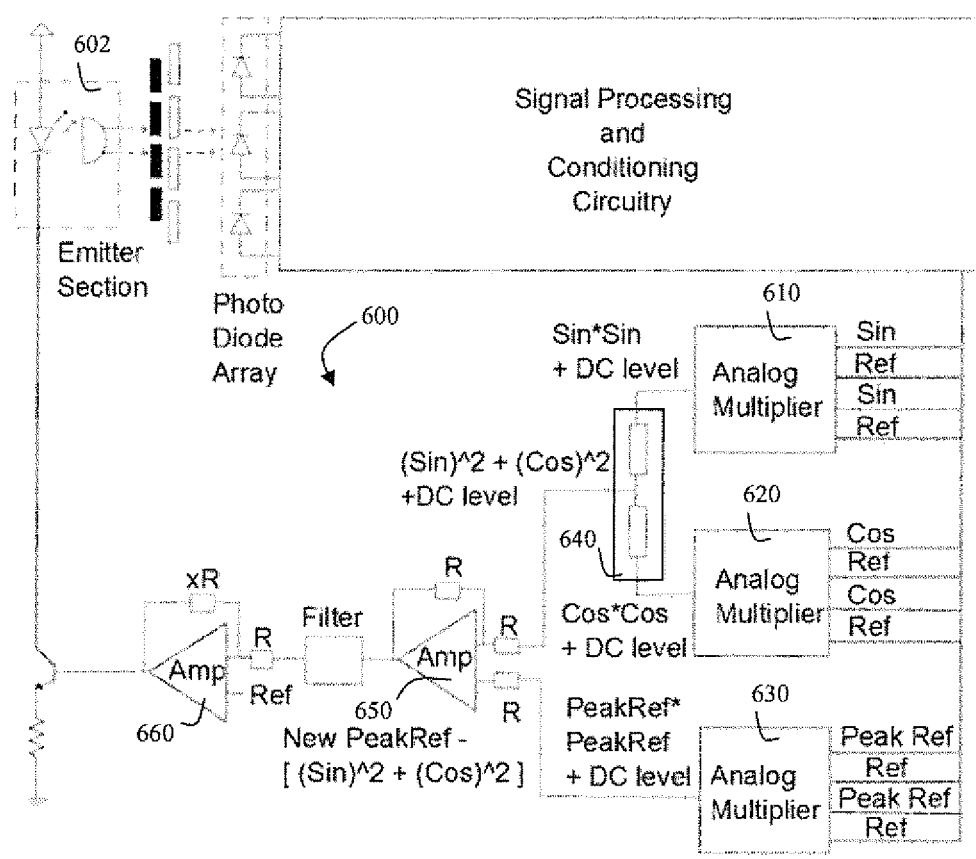
FIG. 6 shows a light emitter regulating circuit for an optical encoder system.

FIG. 6 shows a light emitter regulating circuit for an optical encoder system. In one embodiment, the light emitter regulating circuit 600 may include a first analog multiplier 610, a second analog multiplier 620, a third analog multiplier 630, a summing circuit 640, a comparator 650 and an LED voltage generator 660. In one embodiment, the light emitter regulating circuit 600 may be coupled with a light detector, such as a Photo Diode Array (PDA), and a light emitter of light emitter section 602 for regulating the light emitter in response to the light received by the light detector. Further, signal processing and conditioning circuitry may provide initial processing and/or conditioning of photocurrents generated by the Photo Diode Array of the light detector.

In one embodiment, the light emitter regulating circuit 600 may comprise first analog multiplier 610 having a first multiplier input coupled with the light detector for receiving a sinusoidal detector signal from the light detector. The first analog multiplier 610 may be configured to receive with two sinusoidal detector signals from the light detector, to generate an output of sine squared ("Sin^2") signal having DC offset, if there is any. The DC offset may be the offset value of the input signals when compared with a reference signal.

The light emitter regulating circuit 600 may further comprise second analog multiplier 620 having a second multiplier input coupled with the light detector for receiving a cosinusoidal detector signal from the light detector. The second analog multiplier 620 may be configured to receive as input two cosinusoidal signals 622 from the light detector, to produce an output of cosine squared ("Cos^2") signal with some DC offset. Similarly, the DC offset is the offset value of the input signals if compared with a reference signal.

The light emitter regulating circuit 600 may further comprise a summing circuit 640 coupled with the first multiplier output and the second multiplier output. The summing circuit 640 may be configured to combine the first multiplier output signal, comprising the sine squared ("Sin^2") signal, with the second multiplier output signal, comprising the cosine squared ("Cos^2") signal, so as to generate a first Direct Current (DC) offset signal. The summing circuit may be configured to generate the first DC offset signal (or voltage value) which may represent the Vpp of sinusoidal output signals as generated by the light detector.

Light emitter regulating circuit 600 may comprise third analog multiplier 630 to receive one or more peak reference input voltages. The third analog multiplier 630 may generate a peak reference output signal in response to the one or more peak reference input voltages. The third analog multiplier 630 may be configured to provide a process offset and a thermal offset that are substantially similar (i.e. tracking) to those of the first analog multiplier 610 as well as the second analog multiplier 620.

In one embodiment, the light emitter regulating circuit 600 may comprise DC offset detector 650 (which may be a comparator 650) configured to detect degradation of light emitter 610 by comparing the first Direct Current ("DC") offset signal against the peak reference output signal. The comparator 650 may be configured to detect a voltage difference between the DC offset signal and the peak reference output signal, for substantially determining or substantially ascertaining degradation level of the light emitter. In one embodiment, the peak reference output signal may correspond to a substantially ideal Vpp value of the sinusoidal detector signal from the light detector, which may be generated by the light emitter of an encoder system under a perfect or ideal condition. The peak reference output signal may be used as a reference voltage for gauging light deterioration of the light emitter of the encoder system. Thus, if the Vpp of the sinusoidal detector signal generated by the encoder system has been found to vary from the ideal Vpp value, this would indicate that the generated sinusoidal detector signal may correspond to an offset, hence the light emitter 602 of the encoder system may have deteriorated.

In one embodiment, the light emitter regulating circuit 600 may further comprise an LED voltage generator 660 configured to receive a light emitter regulating signal generated by the comparator 650 as input and also an LED reference voltage to generate an LED regulation voltage. The LED voltage generator 660 may be an operation amplifier which may be configured to convert the light emitter regulating signal to current, which may eventually be used to regulate the LED for compensating LED light degradation.

Different aspects, embodiments or implementations may, but need not, yield one or more of the following advantages. One advantage of the invention may be that regulating the current of the light emitter or LED may provide for boosting light emitter or LED light brightness. Another advantage may be that light brightness degradation in the light emitter or LED may be substantially overcome. Another advantage may be regulating the light emitter or LED in a substantially real time manner.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A light emitter regulating circuit for a light emitter of an optical encoder system comprising:
   a first analog multiplier and a second analog multiplier configured to receive output signals generated by light detectors of the encoder system;
   a third analog multiplier to receive a peak reference input voltage;
   a Direct Current (DC) level generator to generate a first Direct Current (DC) offset level;
   a Direct Current (DC) offset detector to receive the first DC offset level and the peak reference voltage to generate an offset voltage value; and
   a light emitter regulation voltage generator configured to receive the offset voltage value and a light emitter reference voltage to generate a light emitter regulation voltage.

2. The light emitter regulating circuit of claim 1, wherein the first analog multiplier is configured to receive two sine signals to generate a first multiplier output signal, and wherein the first multiplier output signal comprises a sine squared ("Sin2") signal.

3. The light emitter regulating circuit of claim 1, wherein the second analog multiplier is configured to receive two cosine signals to generate a second multiplier output signal, and wherein the second multiplier output signal comprises of a cosine squared ("Cos2") signal.

4. The light emitter regulating circuit of claim 1, wherein:
   the first analog multiplier is configured to generate a first multiplier output signal;
   the second analog multiplier is configured to generate a second multiplier output signal; and
   the DC level generator is configured to combine the first and the second multiplier output signals to generate the first DC offset level.

5. The light emitter regulating circuit of claim 1, wherein the light emitter regulating circuit is configured to regulate the light emitter of the optical encoder in a substantially real time manner.

6. An optical encoder, comprising:
   a first analog multiplier;
   a second analog multiplier;
   a Direct Current ("DC") level generator to generate a first Direct Current ("DC") offset level;
   a Direct Current ("DC") offset detector to receive the first DC offset level and a peak reference voltage to generate an offset voltage value; and
   a light emitter voltage generator configured to receive the offset voltage value and a light emitter reference voltage to generate a light emitter regulation voltage.

7. The optical encoder of claim 6, wherein the first analog multiplier is configured to receive a sinusoidal input signal, and wherein the first analog multiplier is configured to generate a sine squared ("Sin2") signal in response to the sinusoidal input signal.

8. The optical encoder of claim 7, wherein the second analog multiplier is configured to receive a cosinusoidal input signal, and wherein the second analog multiplier is configured to generate a cosine squared ("Cos2") signal in response to the cosinusoidal input signal.

9. The optical encoder of claim 8, wherein the DC level generator is configured to combine the sine squared signal and the cosine squared signal to generate the first DC offset level.

10. An optical encoder, comprising:
    a light emitter;
    an encoder element having a plurality of apertures;
    a light detector optically coupled with the light emitter through the encoder element to receive light transmitted through the plurality of apertures;
    a first analog multiplier and a second analog multiplier coupled to the light detector;
    a summing circuit coupled to the first and second analog multiplier, the summing circuit configured to generate an offset signal;
    a comparator configured to substantially determine a voltage difference between the offset signal and a peak reference signal, and in response thereto, generate a light emitter regulating signal; and
    an amplifier coupled to the comparator to receive the light emitter regulating signal, wherein the amplifier is configured to regulate the light emitter in response to the light emitter regulating signal.

11. The optical encoder of claim 10, wherein:
    the light detector is configured to generate a sinusoidal detector signal and a cosinusoidal detector signal;
    the first and second analog multipliers configured to generate a sine squared signal and a cosinusoidal squared signal from the sinusoidal detector signal and the cosinusoidal detector signal; and
    the summing circuit configured to generate the offset signal from the sine squared signal and the cosinusoidal squared signal.

12. The optical encoder of claim 10, further comprising a first circuit configured to convert the voltage difference into a current to regulate the light emitter.

13. The optical encoder of claim 10, wherein:
    the first analog multiplier is configured to generate a DC offset output;
    the first analog multiplier is coupled to at least one reference signal as input to the first analog multiplier; and
    the first analog multiplier is configured to compare the at least one reference signal and the DC offset output.

14. The optical encoder of claim 10 further comprising a peak reference source configured to generate a peak reference input voltage.

15. The optical encoder of claim 14 further comprising a third analog multiplier circuit configured to generate the peak reference signal, as input to the comparator in response to the peak reference input voltage.

16. The optical encoder of claim 15, wherein the first and second analog multipliers have a first process offset, and wherein the third analog multiplier circuit is configured to provide a second process offset that substantially tracks the first process offset.

17. The optical encoder of claim 15, wherein the first and second analog multipliers have a first thermal offset, and wherein the third analog multiplier circuit is configured to provide a second thermal offset that substantially tracks the first thermal offset.

18. The optical encoder of claim 14, wherein the light detector is configured to generate a sinusoidal detector signal and a cosinusoidal detector signal, and wherein the peak reference source is configured to generate the peak reference input voltage corresponding to a substantially ideal peak-topeak voltage of the sinusoidal detector signal and the cosinusoidal detector signal generated under a substantially ideal condition.

19. The optical encoder of claim 10, wherein the light detector is configured to generate sinusoidal output signals, and wherein the summing circuit is configured to generate a first DC offset signal that is substantially representative of a peak-to-peak voltage of the sinusoidal output signals of the light detector.

20. The optical encoder of claim 10 further comprising a voltage generator configured to convert the light emitter regulating signal into current that regulates the light emitter.

\* \* \* \* \*